United States Patent [19]

Flegel

[11] Patent Number: 5,761,027
[45] Date of Patent: Jun. 2, 1998

[54] POWER INPUT TRANSFER PANEL

[75] Inventor: David D. Flegel, Racine, Wis.

[73] Assignee: Reliance Time Controls, Inc., Racine, Wis.

[21] Appl. No.: 627,739

[22] Filed: Apr. 2, 1996

[51] Int. Cl.$^6$ ................................................. H02B 1/00
[52] U.S. Cl. ............................................. 361/664; 361/825
[58] Field of Search ................................... 174/38, 50, 60;
200/51 R; 307/64, 66, 80, 85–87; 361/622,
625, 627–628, 641, 643, 647, 659–660,
664, 665, 668, 825

[56] References Cited

U.S. PATENT DOCUMENTS

| | | | |
|---|---|---|---|
| 3,361,938 | 1/1968 | Watson | 361/647 |
| 3,654,484 | 4/1972 | Jorgenson et al. | 361/664 |
| 5,070,252 | 12/1991 | Castenschiold et al. | 307/64 |
| 5,268,850 | 12/1993 | Skoglund | 307/64 |

Primary Examiner—Gregory D. Thompson
Attorney, Agent, or Firm—Andrus, Sceales, Starke & Sawall

[57] ABSTRACT

A load center has an enclosure provided with a back wall and a swingable access door, a bus panel secured within the enclosure and a plurality of circuit breakers mounted to the bus panel for switching power between an electrical utility and an auxiliary power source. The load center includes an input receptacle for receiving a plug connector of the auxiliary power source and transferring auxiliary power to the bus panel and the circuit breakers. A pair of watt meters are connected to the input receptacle for monitoring the power transferred from the auxiliary power source. A mounting framework incorporates the input receptacle and the watt meters within the enclosure on the back wall.

31 Claims, 2 Drawing Sheets

POWER INPUT TRANSFER PANEL

FIELD OF THE INVENTION

This invention relates broadly to electrical power distribution apparatus and, more particularly, pertains to a power input transfer panel for connecting an auxiliary source of power, such as a generator, with a residential, commercial or industrial load center.

BACKGROUND OF THE INVENTION

In today's electrical supply systems, there are occasions when alternate sources of electric power are necessary or desirable. For example, the capability of switching from utility power to emergency generator power is extremely important for many businesses, hospitals and industries, and is also being employed in residential applications.

In certain load center applications, it is desirable for separate electrical circuits or even separate groups of electrical circuits to be arranged so that when one group of circuits is switched to a conductive state, another group of circuits is switched to a non-conductive state in alternating fashion. In these applications, it is well known to employ a main power input transfer panel having a plurality of circuit breakers for switching one group of circuits off and switching the other group of circuits on. In some arrangements, it may be desirable to alternately switch a common load between separate power sources so that as one power source is disconnected from the load, the second power source is quickly connected to prevent minimal interruption of power to the load.

In order to effect the desired transfer between a primary power source of electrical utility and a secondary power source, such as provided from a generator, it is normal practice to install a separate transfer switch enclosure outside the main power input transfer panel. Unfortunately, the separate installation of the transfer switch necessitates further cost in the hardware and service associated therewith, and causes an electrician to access two separate pieces of equipment when dealing with a simulated or actual power outage.

Accordingly, it is desirable to provide a load center which eliminates the aforementioned drawback by directly incorporating the transfer switch capability into the main power input transfer panel. Such an arrangement should eliminate the danger of backfeeding the utility as well as preventing utility power from feeding into the generator and causing damage to the generator.

SUMMARY OF THE INVENTION

The present invention advantageously provides a unique power interface in a standard load center for the specific purpose of providing a safe, simple and convenient arrangement for transferring power to the selected circuits from an auxiliary power source, such as a portable generator, during a utility power outage. The present invention enables the use of currently available power input transfer panels which may be retrofitted without extensive modification of the panel.

In one aspect of the invention, a power input transfer panel has a main wall, a bus panel supported on the main wall and a plurality of circuit breakers mounted to the bus panel for switching power between an electrical utility and an auxiliary power source. The power input transfer panel comprises an input arrangement adapted to be connected to the auxiliary power source, and a mounting framework securing the input arrangement to the main wall. The input arrangement includes an input device for transferring power from the auxiliary power source. The input device is connectable with the auxiliary power source and has a plugged relationship therewith. The input arrangement also includes at least one meter for monitoring the power transferred from the auxiliary power source. The mounting framework includes a substantially flat face plate and a pair of bent side brackets, each of the side brackets having one end connected to the main wall and another end secured to the face plate.

In another aspect of the invention, a load center has an enclosure provided with a back wall and a swingable access door, a bus panel secured within the enclosure and a plurality of circuit breakers mounted to the bus panel for switching power between an electrical utility and an auxiliary power source. An input receptacle is provided for receiving the auxiliary power source and transferring auxiliary power to the bus panel and the circuit breakers. A pair of watt meters are connected to the input receptacle for monitoring the power transferred from the auxiliary power source, and a mounting framework secures the input receptacle and the watt meters within the enclosure to the back wall. The mounting framework includes a substantially flat face plate, and a pair of spaced apart, parallel side brackets. Each of the side brackets has an outwardly directed rearward end secured to the back wall, and an inwardly directed forward end joined to the face plate. The input receptacle includes a cylindrical body and a circular collar adapted to overlie the face plate. The input receptacle and the watt meters project through the face plate and are both accessible through the access door of the enclosure.

In yet another aspect of the invention, there is contemplated a method for incorporating an auxiliary power source within a power distribution panel having a main wall, a bus panel supported by the main wall and a set of circuit breakers for switching power between a primary power source and the auxiliary power source. The method comprises the steps of providing an input arrangement adapted to be connected with the power source, and securing the input arrangement directly to the main wall of the panel.

In still yet another aspect of the invention, there is contemplated a method of providing a transfer of power from an electrical utility power source to a generator power source employing a power distribution panel having a main wall, a bus panel supported by the main wall, and branch circuit breakers and utility supply and generator supply circuit breakers for switching power between the electrical utility power source and the generator power source. Each of the circuit breakers has a handle switchable between OFF and ON positions. The method comprises the steps of providing an input arrangement adapted to be connected with the auxiliary power source; incorporating the input arrangement directly into the main wall of the panel; moving the handles of the utility supply circuit breakers and the branch circuit breakers to the OFF position upon an interruption in the electrical power in the electrical utility power source; moving the handles of the generator supply circuit breakers to the ON position; plugging a power cord from the generator power source into the input arrangement on the main wall of the panel; activating the generator power source to provide a source of power; and selectively moving the handles of the branch circuit breakers to the ON position in accordance with monitoring the input arrangement so as not to exceed the capacity of the generator power source.

Various other features, objects and advantages of the invention will be made apparent from the following detailed description taken together with the drawings.

BRIEF DESCRIPTION OF THE DRAWINGS

The invention will become better understood by reference to the following detailed description of the preferred exemplary embodiment when read in conjunction with the appended drawing wherein like numerals denote like elements.

DETAILED DESCRIPTION OF THE PREFERRED EMBODIMENT

Figure 1:
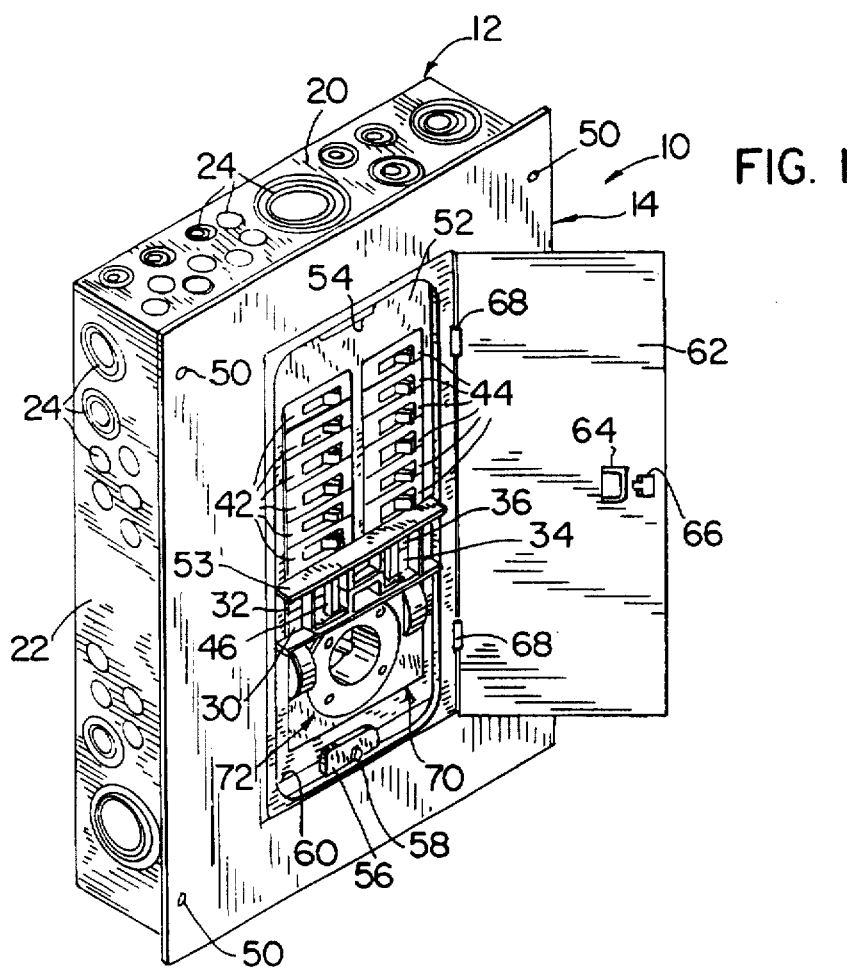
FIG. 1 is an isometric view of a power input transfer panel embodying the present invention.

The preferred embodiment of the inventive power input transfer panel is generally identified in FIGS. 1–4 by the reference numeral 10. The power input transfer panel 10 is shown in the form of an enclosed load center comprising a base 12 and a front cover 14.

Base 12 is integrally formed with a main or back wall 16 having a grounding bar 18, opposed end walls 20, and opposed side walls 22, each of which is provided with variably sized circular openings 24 that are selectively knocked out to accommodate suitable electric conductors entering and exiting the panel 10. Although not illustrated, back wall 16 can be formed with suitable holes to facilitate a suspended mounting on a wall, or the entire base 12 can be recessed in the wall as desired.

Centrally located on the back wall 16 of load center 10 is a generally rectangular bus panel 26 provided with a pair of parallel, neutral side bars 28 and a copper bus (not shown) onto which a plurality of tandemly aligned main circuit breaker switch modules, each of which includes switches 30, 32, 34, 36, are snapped. Circuit breaker switches 30, 32, 34, 36 depicted are standard commercially available electrical mechanisms of the type manufactured by the I.T.E. Circuit Protection Division of Siemens Energy and Automation, Inc. and commonly labeled Type QP. It is the usual design of the switches to have spring biased, over the center operating handles ganged together by tie bars, such as 38, 40. In usual operation, these handles are employed to manually ON and OFF switch the circuit controlled by that switch. Such switches are designed such that when the electrical device is ON switched and a current overload occurs, the internal mechanism causes the device to OFF switch. Thus, both switching functions are combined in a single unit. In the embodiment to follow, it will be assumed that switches 30, 32, are fed from power from an electrical utility, while switches 34, 36 are fed from an auxiliary power source such as a portable generator. Other utility side circuit breaker switches 42 and opposed generator side circuit breaker switches 44 are available along the bus panel 26 to feed branch circuits intended to be fully operational during a power outage.

Circuit breaker switches 30, 32, 34, 36 are typically designed such that their operating handles are positioned away from each other when the switches are OFF and are oriented towards each other when the switches are ON. As is well known, the circuit breaker switches are provided with an interlock 46 which ensures that a pair of circuit breaker switches in opposed orientation with opposed handles mechanically interconnected will be mutually constrained so that only one of the circuit breaker switches can be in the ON position at any one time. An example of such an interlock 46 is disclosed in pending U.S. patent application Ser. No. 08/491,794 filed Jun. 15, 1995 and commonly owned by the assignee of this application, the disclosure of which is hereby incorporated by reference.

The base 12 includes peripheral flanges 20a and 22a along respective forward portions of the end walls 20 and side walls 22.

Flanges 22a are suitably formed with apertures 48 which are aligned with complementary apertures in the front cover 14. Fasteners 50 are passed through the apertures in cover 14 and are screwthreaded into apertures 48 to hold the cover 14 against the base 12. An inner panel 52 (FIG. 1) is secured to upper and lower tabs 54, 56 on the front cover 14 by fasteners 58. An upper portion of inner panel 52 is suitably knocked out to accommodate the circuit breaker switches 30, 32, 34, 36, 42, 44 which are aligned with and are accessible through a generally rectangular opening 60 formed in the front cover 14. In order to focus on the main circuit breaker switches 30, 32, 34 and 36, an isolation frame 53 on the inner panel 52 surrounds the switches 30, 32, 34 and 36 and identifies the utility supply and generator supply sides of the panel 10. An access door 62 is provided with a movable latch 64 and a spring 66 to form a biased closure engageable with a catch on the front cover 14. Door 62 is mounted by hinges 68 to the front cover 14 so that it will open and close upon the opening 60 and enable access to the enclosed load center 10 when desired or necessary.

Figure 3:
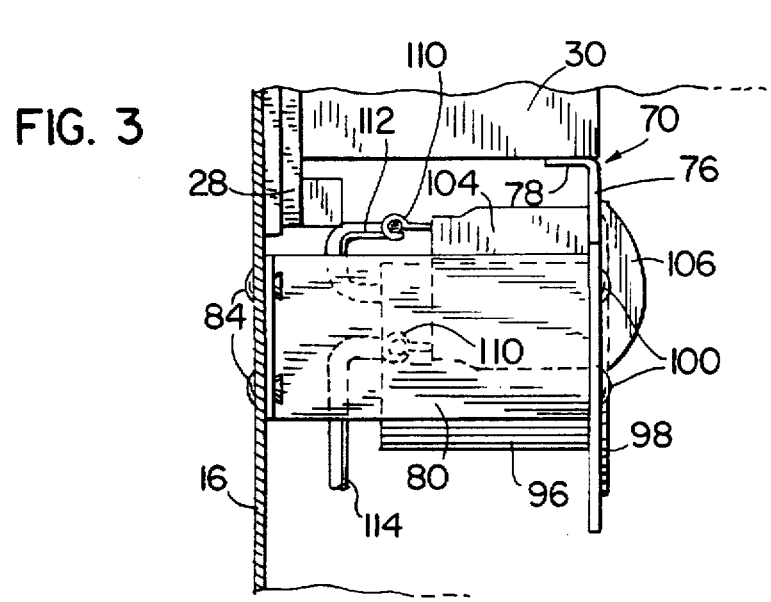
FIG. 3 is an enlarged, cross-sectional view taken on line 3—3 of FIG. 2 showing details of a mounting framework for the auxiliary power input arrangement.
Figure 4:
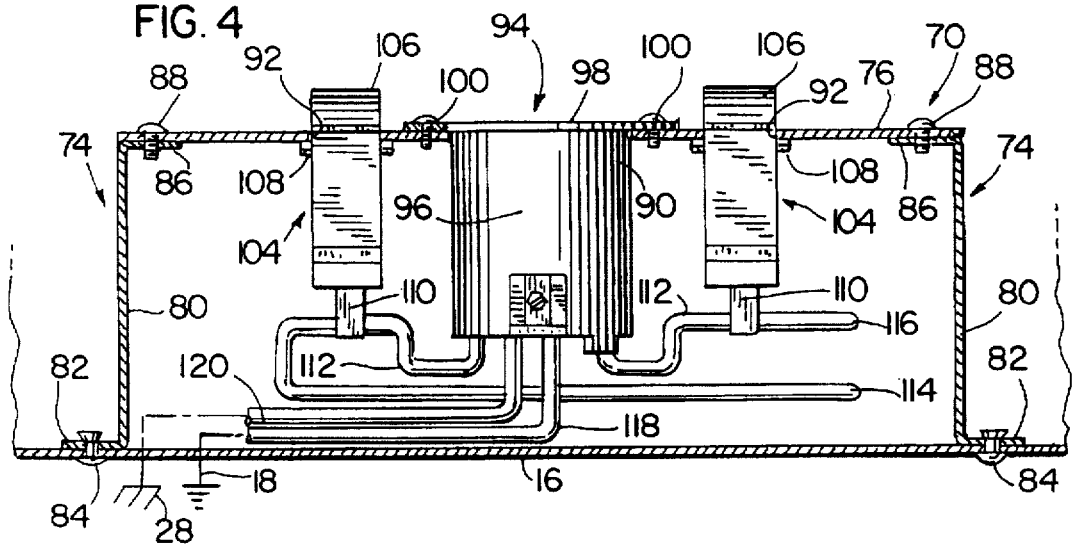
FIG. 4 is an enlarged, cross-sectional view taken on line 4—4 of FIG. 2 showing further details of the mounting framework for the input arrangement.

As a salient feature of the invention, a rigid mounting framework 70 (FIGS. 3, 4) is employed to conveniently and directly mount an input arrangement 72 to the back wall 16 of the panel 10. As is standard practice, the input arrangement 72 is adapted to be connected with an auxiliary source of power, such as a generator, in the event of a primary or utility power outage. Referring to FIGS. 3 and 4, mounting framework 70 comprises a pair of identical, parallel, spaced side brackets 74 and a substantially flat face plate 76 having an upper ledge 78 engageable with the downwardly facing side surface of the breaker module containing circuit breaker switches 30, 34. Each side bracket 74 has a side plate 80 which is suitably bent at approximately 90° relative to an outwardly directed rearward end 82 attached to the back wall 16 by fasteners 84, and relative to an inwardly directed forward end 86 attached to the face plate 76 by screws 88. The face plate 76 is appropriately formed with a central, circular opening 90 flanked generally equidistantly on each side thereof by a rectangular opening 92. Input arrangement 72 includes a plug-like input device 94 in the form of a receptacle having a generally cylindrical body 96 which projects at its forward end through the central opening 90, and a circular collar 98 which overlies the face plate 76 and is secured thereto by screws 100. The input device 94 has four male terminals 102 generally spaced 90° apart for receiving the female end of a plug from the generator. Input arrangement 72 further includes a pair of watt meters 104 used to monitor the power delivered by the generator. Each of the watt meters 104 has a convexly-shaped window 106 which projects through a respective rectangular opening 92 and is attached to the inside of the face plate 76 by retainers 108. As best seen in FIG. 1, the inner panel 52 of front cover 14 is suitably knocked out so that when attached to the back wall 16 by mounting framework 70, input arrangement 72 lies directly below and in alignment with the circuit breaker switches 30, 32, 34, 36. Input arrangement 72 is conveniently accessible via the access door 62 and is incorporated directly into the enclosed load panel 10, in contrast to the prior art input arrangement which is inconveniently located in a separate enclosure adjacent to the load center.

In order to electrically connect the input arrangement 72 with the remaining components in panel 10, the input device 94 and the watt meters 104 are provided with terminals 110 for connection with suitable wiring. In particular, a pair of wires 112 runs between the input device 94 and each of the watt meters 104. A second wire 114 and a third 10 wire 116 run from each of the watt meters 104 to respective connections with the generator supply circuit breaker switches 34, 36. A fourth wire 118 extends from the input device 94 to the grounding bar 18 and a fifth wire 120 extends from the input device 94 to the neutral bar 28.

Figure 2:
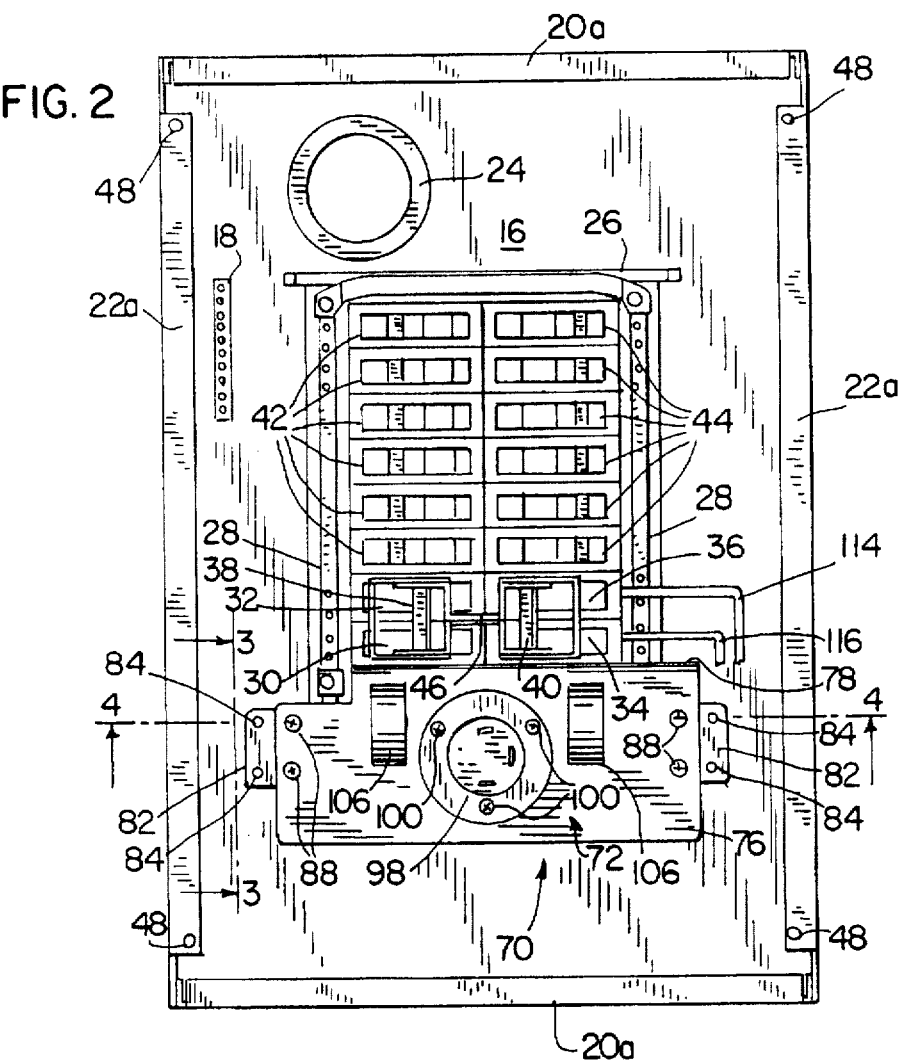
FIG. 2 is a plan view of the power input transfer panel shown in FIG. 1 with the front cover removed to illustrate an auxiliary power input arrangement incorporated directly into the power input transfer panel.

FIG. 2 illustrates a representation of a switching operation occurring during a typical utility power interruption. Normally (opposite to that shown in FIG. 2), the branch circuit breaker switches 42, 44 are in the ON position, circuit breaker switches 30, 32 are in the ON position and circuit breaker switches 34, 36 are in the OFF position under usual conditions when electrical utility power is uninterrupted and fully available. With switches 30, 32 ON, the bus panel 26 is fed from the electrical utility. Switches 34, 36 are OFF so no power can be transmitted either to or from the generator. In the event of a utility power failure, interlock 46 enables utility supply switches 30, 32 to turn OFF, and generator supply switches 34, 36 to turn ON as illustrated in FIG. 2, and branch circuit breaker switches 42, 44 are turned OFF. At this point, a power cord is plugged into the receptacle of the input device 94 and the generator is started. With auxiliary power now available in place of the utility power, the branch circuit breaker switches 42, 44 are selectively manually turned ON as desired to complete the respective circuits to their particular appliance loads. While performing the switching function, the user carefully monitors the watt meters 104 so as to balance the loads and not exceed the capacity of the generator. Since switches 30, 32 are OFF, generator power cannot be fed to the utility supply. Likewise, if power is restored, it will not be fed to the bus panel 26. In the event of a power restoration, the generator is shut off and unplugged. Circuit breaker switches 30, 32, and 34, 36 are respectively turned ON and OFF and branch circuit breaker switches 42, 44 are turned ON.

It should be appreciated that the present invention provides a simple, economical and safe interface for a power input transfer panel 10 which ensures that electrical power can be supplied at all times to circuits interconnected to various appliances. Unlike the prior art transfer switches, an input arrangement associated with an auxiliary source of power is integrated into a load center enclosure which markedly improves service response and reduces installation costs. The mounting framework is effective to support the input arrangement yet is easy to install and does not result in a great increase in cost over the regular cost of the power input transfer panel.

While the invention has been described with reference to a preferred embodiment, those skilled in the art will appreciate that certain substitutions, alterations and omissions may be made without departing from the spirit thereof. For example, although the input arrangement 72 preferably comprises a pair of watt meters 104, it should be understood that a pair of ammeters may also be employed in lieu thereof to monitor electrical power. Accordingly, the foregoing description is meant to be exemplary only, and should not be deemed limitative on the scope of the invention set forth with following claims.

I claim:

1. A power input transfer panel having a housing with a main wall and a front cover, a bus panel supported on the main wall and a plurality of circuit breakers mounted to the bus panel for switching power between an electrical utility and an auxiliary power source, the power input transfer panel comprising:

an input arrangement adapted to be connected to said auxiliary power source and made accessible through an opening formed in said front cover; and a mounting framework securing said input arrangement to said main wall totally within said housing.

2. The panel of claim 1, wherein said input arrangement includes an input device for transferring power from said auxiliary power source, said input device being connectable with said auxiliary power source and having a plugged relationship therewith.

3. The panel of claim 1, wherein said input arrangement includes at least one meter for monitoring the power transferred from said auxiliary power source.

4. The panel of claim 1, wherein said mounting framework includes a substantially flat face plate and a pair of side brackets, each of said side brackets having one end connected to said main wall and another end secured to said face plate.

5. The panel of claim 4, wherein said input arrangement extends through and is fixed to said face plate.

6. The panel of claim 2, wherein said input arrangement includes a pair of spaced watt meters, one of said watt meters being located to one side of said input device and the other of said watt meters being located on another side of said input device.

7. The panel of claim 1, wherein said mounting framework disposes said input arrangement below and in alignment with said circuit breakers.

8. The panel of claim 6, wherein said input device and said watt meters are connected to said circuit breakers and said bus panel.

9. A load center having an enclosure provided with a back wall and a swingable access door, a bus panel secured within the enclosure and a plurality of circuit breakers mounted to the bus panel for switching power between an electrical utility and an auxiliary power source, the load center comprising:

an input receptacle for receiving said auxiliary power source and transferring auxiliary power to said bus panel and said circuit breakers;

at least one watt meter connected with said input receptacle for monitoring the power transferred from said auxiliary power source; and a mounting framework securing said input receptacle and said watt meter totally within said enclosure to said back wall.

10. The load center of claim 9, wherein said input receptacle and said watt meter is accessible through said access door of said enclosure.

11. The load center of claim 9, wherein said mounting framework includes a substantially flat face plate, and a pair of spaced apart, parallel side brackets, each of said side brackets having a rearward end secured to said back wall, and a forward end joined to said face plate.

12. The load center of claim 11, wherein said face plate includes a ledge adapted to abut against said circuit breakers.

13. The load center of claim 11, wherein said input receptacle and said watt meter project through said face plate.

14. The load center of claim 11, wherein said input receptacle includes a cylindrical body and a circular collar adapted to overlie said face plate.

15. The load center of claim 9, wherein said at least one watt meter comprises a pair of watt meters, and wherein said watt meters are spaced generally equidistantly from said input receptacle.

16. In a power transfer panel including a housing, a utility power supply, a plurality of branch circuit breakers disposed within the housing, and a switching arrangement for selectively connecting and disconnecting the branch circuit breakers to and from the utility power supply, the improvement comprising an auxiliary power supply device totally disposed within and mounted to the housing, along with a utility power switching arrangement for selectively connecting and disconnecting the branch circuit breakers to and from the auxiliary power supply device.

17. The improvement of claim 16, wherein the auxiliary power supply device comprises a power supply receptacle secured to the housing via a bracket assembly.

18. The improvement of claim 16, wherein the housing includes a front wall, and further comprising an opening forward of the front wall for providing access to the power supply device.

19. The improvement of claim 18, further comprising a door mounted to the front wall for selectively enclosing the opening, and wherein the branch circuit breakers and the switching arrangement are accessible via the opening and the door is operable to control access thereto.

20. A method for incorporating an auxiliary power source within a power distribution panel having a housing with a main wall and a front cover, a bus panel supported by the main wall and a set of circuit breakers for switching power between a primary power source and the auxiliary power source, the method comprising the steps of:

providing an input arrangement adapted to be connected with said auxiliary power source and made accessible through an opening formed in said front cover; and securing said input arrangement totally within said housing directly to said main wall of said power distribution panel.

21. A method of providing a transfer of power from an electrical utility power source to a generator power source employing a power distribution panel having a housing with a main wall and a front cover, a bus panel supported by the main wall, and branch circuit breakers and utility supply and generator supply circuit breakers mounted on the bus panel for switching power between the electrical utility power source and the generator power source, each of the circuit breakers having a handle switchable between OFF and ON positions, the method comprising the steps of:

providing an input arrangement adapted to be connected with said auxiliary power source and made accessible through an opening formed in said front cover;

incorporating said input arrangement directly into said panel totally within said housing;

moving said handles of said utility supply circuit breakers and said branch circuit breakers to the OFF position upon an interruption in said electrical utility power source;

moving said handles of said generator supply circuit breakers to the ON position;

plugging a power cord from said generator power source into said input arrangement through said opening in said front cover;

activating the generator power source to provide a source of power; and selectively moving the handles of said branch circuit breakers to the ON position in accordance with monitoring said input arrangement so as not to exceed the capacity of said generator power source.

22. A power input transfer panel having a main wall, a bus panel supported on the main wall and a plurality of circuit breakers mounted to the bus panel for switching power between an electrical utility and an auxiliary power source, the power input transfer panel comprising:

an input arrangement adapted to be connected to said auxiliary power source; and a mounting framework securing said input arrangement to said main wall, wherein said mounting framework includes a substantially flat face plate and a pair of side brackets, each of said side brackets having one end connected to said main wall and another end secured to said face plate.

23. The panel of claim 22, wherein said input arrangement extends through and is fixed to said face plate.

24. The panel of claim 22, wherein said input arrangement includes an input device for transferring power from said auxiliary power source, said input device being connectable with said auxiliary power source and having a plugged relationship therewith, and wherein said input arrangement includes a pair of spaced watt meters, one of said watt meters being located to one side of said input device and the other of said watt meters being located on another side of said input device.

25. The panel of claim 24, wherein said input device and said watt meters are connected to said circuit breakers and said bus panel.

26. A load center having an enclosure provided with a back wall and a swingable access door, a bus panel secured within the enclosure and a plurality of circuit breakers mounted to the bus panel for switching power between an electrical utility and an auxiliary power source, the load center comprising:

an input receptacle for receiving said auxiliary power source and transferring auxiliary power to said bus panel and said circuit breakers;

at least one watt meter connected with said input receptacle for monitoring the power transferred from said auxiliary power source; and a mounting framework securing said input receptacle and said watt meter within said enclosure to said back wall, wherein said input receptacle and said watt meter are accessible through said access door of said enclosure.

27. The load center of claim 26, wherein said mounting framework includes a substantially flat face plate, and a pair of spaced apart, parallel side brackets, each of said side brackets having a rearward end secured to said back wall, and a forward end joined to said face plate.

28. The load center of claim 27, wherein said face plate includes a ledge adapted to abut against said circuit breakers.

29. The load center of claim 27, wherein said input receptacle and said watt meter project through said face plate.

30. The load center of claim 27, wherein said input receptacle includes a cylindrical body and a circular collar adapted to overlie said face plate.

31. The load center of claim 26, wherein said at least one watt meter comprises a pair of watt meters, and wherein said watt meters are spaced generally equidistantly from said input receptacle.

* * * * *